UNITED STATES PATENT OFFICE.

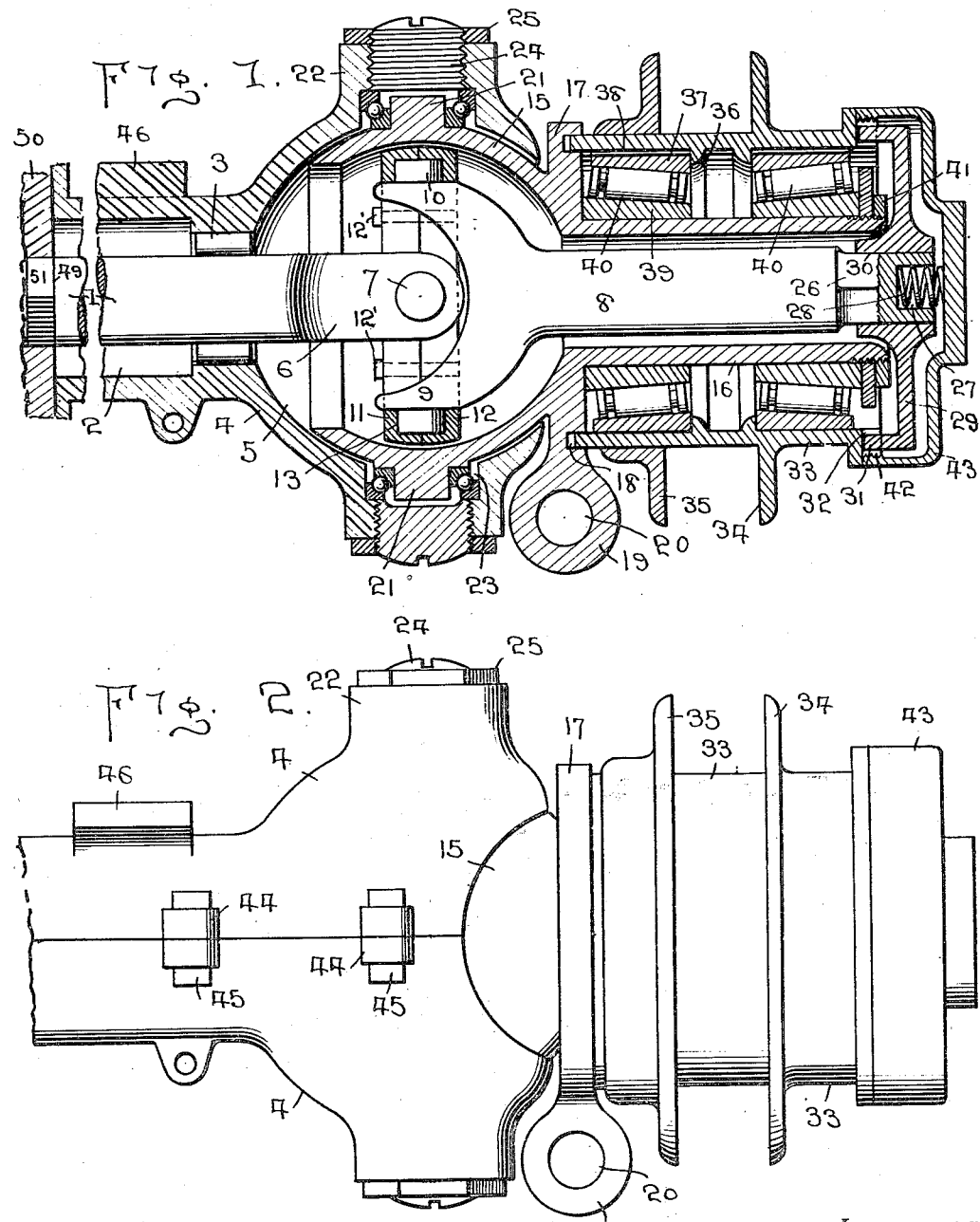

WILLIAM A. BESSERDICH, OF CLINTONVILLE, WISCONSIN, ASSIGNOR OF ONE-HALF TO BERNHARD A. MOSLING, OF CLINTONVILLE, WISCONSIN.

STEERING MECHANISM.

1,152,874.   Specification of Letters Patent.   Patented Sept. 7, 1915.

REISSUED

Application filed June 7, 1912, Serial No. 702,225. Renewed March 2, 1915. Serial No. 11,579.

*To all whom it may concern:*

Be it known that I, WILLIAM A. BESSERDICH, a citizen of the United States, residing at Clintonville, in the county of Waupaca and State of Wisconsin, have invented certain new and useful Improvements in Steering Mechanisms, &c.; and I do hereby declare the following to be a full, clear, and exact description of the invention, such as will enable others skilled in the art to which it appertains to make and use the same.

This invention relates to wheel hubs and it more particularly relates to an improved steering mechanism for automobiles and the like.

An object of the invention is to provide improved means in connection with the front axle of a vehicle whereby the vertical plane of a wheel may be changed while the wheel is rotated, and thereby guide the vehicle.

A further object of the invention is to provide a device of this character which is substantially dust-proof.

A still further object of the invention is to provide an improved arrangement of roller bearings on which the wheel hub rotates.

A still further object is to provide a device of this character which is compact, strong, durable and thoroughly efficient.

Other objects and advantages may be recited hereinafter and in the claim.

In the accompanying drawings which form a part of this application, Figure 1 is a vertical longitudinal sectional view through the mechanism which constitutes my invention, and, Fig. 2 is an elevation view of the same.

Referring to these drawings, in which similar reference characters correspond with similar parts throughout the several views, the numeral 1 designates a fragmental end portion of the front axle of the vehicle, said axle being adapted to rotate within a housing 2; any suitable form of bearings 3 being provided between said axle and said housing. The housing 2 is integrally united with a second housing 4 which is of substantially spherical contour, and having a substantially spherical chamber 5 into which a bifurcated end 6, of the axle 1, extends. Trunnions 7 are formed upon the bifurcated ends 6. A stub axle 8 is axially alined with the main axle 1, and said stub axle is provided with a bifurcated end, the furcations 9 of which are provided with trunnions 10. Connecting rings 11 and 12, provided with semi-cylindrical apertures 13, are fitted together in such relation that the apertures register and engage the trunnions 7 and 10. These rings 11 and 12 are secured together by means of bolts 12', and therewith, constitute a connecting member for a universal joint, connecting with the bifurcated ends of the axles 1 and 8. Said universal joint is inclosed by a substantially spherical end portion 15 of a skein member, said skein member also comprising a cylindrical portion 16 and a radial flange 17, the latter being formed around the cylindrical portion 16, at its junction with the portion 15, and being provided with an annular channel 18, in one of its vertical surfaces, the flange also being provided with a depending lug 19 having an aperture 20 therethrough.

The portion 15 of the skein is inclosed by the housing 4, and is provided with trunnions 21 which are rotatably seated within a pair of apertured bosses 22, the latter being formed on the housing 4, and having their apertures 23 diametrically opposed relative to the spherical housing; and while I do not limit my invention to these exact details of construction, I prefer to mount the trunnions 21 on ball bearings, as shown. The apertures 23 are screw threaded for the reception of an adjusting screw 24, an elongated nut 25 being provided for retaining the screw and the ball bearings in adjustment, in an obvious manner.

The stub axle 8 is surrounded by the cylindrical portion 16 of the housing, and the outer end 26 of said stub axle is square in cross section, and is provided with an aperture or spring seat 27 for receiving a spring 28. A hub engaging member or disk 29 is provided with a central and squared aperture 30 and thereby adapted to be seated upon the portion 26 of the stub axle, so as to rotate therewith. The disk 29 is provided with lugs 31 which are seated within the apertures 32, in an end of a hub member or barrel 33, said barrel being provided with a radial flange 34, which together with a flanged ring 35, constitute an annular seat for the ends of wheel spokes (not shown). The barrel is provided with internal flanges 36, against which roller bearing races 37 are seated, said races being snugly fitted against the inner wall of the barrel, and being secured against rotation by means of keys 38. Roller bearing races 39 are snugly fitted upon the cylindrical portion of the skein member, and may be secured in position by any proper means (not shown). All of the bearing races are tapered in cross section, the direction of taper of the races 37 being opposite to that of the races 39, so that the roller bearings 40, when placed therebetween, have their axes inclined with relation to the stub axle 8; and it will be seen, in Fig. 1, that, by moving the barrel to the left, the left-hand race 37 will be tightened upon the left-hand rollers 40, and that by tightening the adjusting nut 41, the right hand race 39 will be moved leftward, so as to tighten upon the right-hand rollers 40.

One end of the shaft 1 is squared and is fitted into a central aperture in a transmission member 50. The outer end of the barrel is threaded at 42 for engagement with a cap 43, against which the spring 28 is seated, and in coöperation therewith, holds the left shoulder 49, of the squared end portion 51, against the differential gear member 50, so as to prevent undue longitudinal movement of the shaft relative to the barrel, and to keep the universal joint from rattling when the bearings thereof have become worn. The left hand end of the barrel extends into the annular groove 18 and coacts therewith for excluding dust, sand or the like from the roller bearings. Between the flanges 36 is provided an annular space or groove which may be filled with vaseline or any similar lubricating material, so that if the bearings and barrel should become unduly heated, the vaseline will melt and flow between the roller bearings, so as to properly lubricate and reduce the heat of the bearings.

The housing 4 is horizontally divisible, being formed in sections, as shown in Fig. 2, said sections being provided with apertured lugs 44, bolts 45 being seated in the apertures of the lugs for holding the two sections in unity. The upper section is provided with a chassis seat 46, and any proper means (not shown) may be employed for securing the same to the chassis of an automobile or other vehicle. By thus making the casing or housing 4 divisible, the lower section thereof may be removed when it is desired to repair the universal joint or to replace any of the parts thereof, so that access may be had to the interior of the spherical portion 15, for removing or replacing the bolts 12′ which hold the rings 11 and 12 together.

An arm, lever or other proper means (not shown) may be secured to the lug 19, the aperture 20 providing a practical means for connecting the same; and it will be readily seen, that by simply manipulating the lug 19, the skein member and the elements carried thereby may be swung on an arc of a circle having the centers of the trunnions 21 as its axis, and thereby direct the movement of a vehicle having wheels equipped with this improved construction. It will also be readily seen that when the axle 1 is rotated, the stub axle 8 and the hub or barrel 33 will also rotate through the medium of the universal joint, within the skein member, regardless of the relative positions of the axles 1 and 8.

It is obvious that I have provided a thoroughly practical and efficient device of this character, which is fully capable of attaining the foregoing objects.

I do not limit my invention to the exact details of construction, combination and arrangement of parts, as herewith illustrated and described, but my invention may only be limited by a reasonable interpretation of the claim.

I claim:—

In a device of the character described, a housing of substantially spherical contour, a skein member having a substantially spherical end portion extending within said housing, an axle having a bifurcated end extending within said end portion of the skein member, a stub axle extending within said spherical end portion and bifurcated, the bifurcations of said axle and stub axle being provided with trunnions, a pair of oppositely disposed rings provided each with semi-cylindrical apertures to receive said trunnions, means detachably uniting said rings, said housing having oppositely disposed apertured bosses and the skein member having trunnions rotatably seated therein located diametrically opposite said housing, adjusting screws having threaded engagement with said bosses, interposed ball bearings for the trunnions of the skein member, nuts for retaining said screws and ball bearings in adjustment, said housing being horizontally separable, and a wheel hub mounted on said skein member and having spoke attaching means out of alinement with said bosses and screws.

In testimony whereof I have signed my name to this specification in the presence of two subscribing witnesses.

WILLIAM A. BESSERDICH.

Witnesses:
LLEWELLYN COLE,
MAY MORDENHAUER.